US012596504B2

(12) United States Patent
Pinto et al.

(10) Patent No.: US 12,596,504 B2
(45) **Date of Patent: \*Apr. 7, 2026**

(54) SYSTEMS, METHODS, AND APPARATUS FOR COMPUTATIONAL STORAGE FUNCTIONS

(71) Applicant: Samsung Electronics Co., Ltd., Suwon-si (KR)

(72) Inventors: Oscar P. Pinto, San Jose, CA (US); William Martin, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/796,285

(22) Filed: Aug. 6, 2024

(65) Prior Publication Data

US 2024/0393984 A1 Nov. 28, 2024

Related U.S. Application Data

(63) Continuation of application No. 17/705,269, filed on Mar. 25, 2022, now Pat. No. 12,073,116.

(60) Provisional application No. 63/185,355, filed on May 6, 2021.

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/067* (2013.01); *G06F 3/0679* (2013.01)

(58) Field of Classification Search
CPC ..... G06F 3/0659; G06F 3/0604; G06F 3/0679
See application file for complete search history.

(56) References Cited

U.S. PATENT DOCUMENTS

| | | | |
|---|---|---|---|
| 12,073,116 B2 * | 8/2024 | Pinto | G06F 3/067 |
| 2006/0282475 A1 * | 12/2006 | Suermondt | G06F 16/20 |
| 2014/0215453 A1 * | 7/2014 | Peng | G06F 8/61 |
| | | | 717/174 |
| 2019/0250852 A1 | 8/2019 | Kabra et al. | |
| 2020/0252458 A1 | 8/2020 | Bhatia et al. | |
| 2022/0188028 A1 * | 6/2022 | Mesnier | G06F 3/0659 |

FOREIGN PATENT DOCUMENTS

| | | |
|---|---|---|
| CN | 111459471 A | 7/2020 |
| WO | 2018111987 A1 | 6/2018 |

OTHER PUBLICATIONS

Final Office Action for U.S. Appl. No. 17/705,269, mailed Feb. 14, 2024.

(Continued)

*Primary Examiner* — Edward J Dudek, Jr.
(74) *Attorney, Agent, or Firm* — Renaissance IP Law Group LLP

(57) ABSTRACT

Provided are systems, methods, and apparatuses for managing functions for storage devices. The method can include: determining one or more functions associated with a first device and determining one or more corresponding function types for the functions; grouping the functions based on the function types using a group name; and providing the group name to a second device for use in connection with an associated application, wherein the storage device comprises a computational storage (CS) device.

20 Claims, 10 Drawing Sheets

(56)     References Cited

OTHER PUBLICATIONS

Notice of Allowance for U.S. Appl. No. 17/705,269, mailed Apr. 16, 2024.
Office Action for U.S. Appl. No. 17/705,269, mailed Aug. 10, 2023.
SNIAVIDEO, "PM+CS Summit 2021: How Computational Storage Can Become a new Standard for Cloud Architectures" URL: https://www.youtube.com/watch?v=bajep7cyxM4, Apr. 23, 2021, 2 pages.

\* cited by examiner

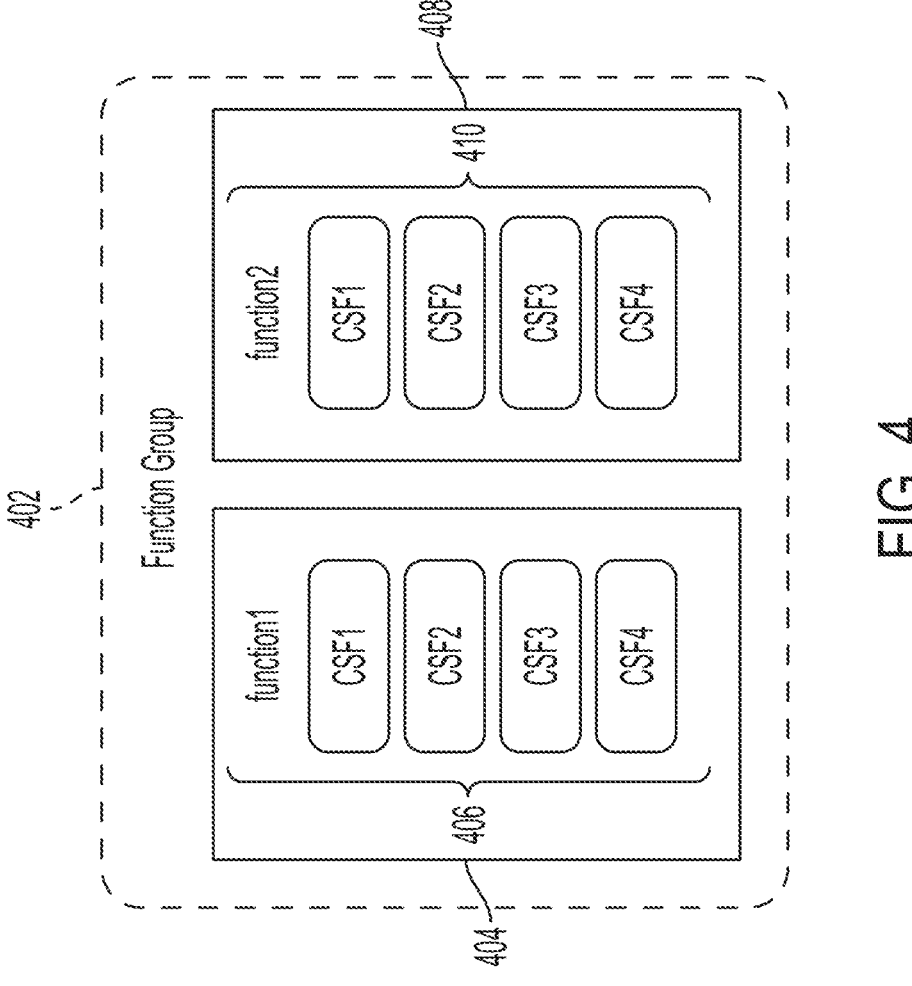
FIG. 4

| 502 | Discover one or more functions associated with a device |
|---|---|

| 504 | Create list of the functions |
|---|---|

| 506 | Classify the functions by function type |
|---|---|

| 508 | Group the functions based on the function type |
|---|---|

| 510 | Advertise the functions as a second function (e.g., global function) to a host application |
|---|---|

| 512 | Discover properties associated with the functions and can re-classify the functions based at least in part on those properties |
|---|---|

| 514 | Advertise the properties back to the user |
|---|---|

| 516 | Permit a user to chose a given function based on the advertisements and the disclosed systems can provide the function to the user device |
|---|---|

FIG. 5

SYSTEMS, METHODS, AND APPARATUS FOR COMPUTATIONAL STORAGE FUNCTIONS

CROSS-REFERENCE TO RELATED APPLICATIONS

This application is a continuation of U.S. patent application Ser. No. 17/705,269, filed Mar. 25, 2022, now allowed, which claims the benefit of U.S. Provisional Patent Application Ser. No. 63/185,355, filed May 6, 2021, which is incorporated by reference herein for all purposes.

FIELD

The disclosure relates generally to a storage system, and more particularly to systems and methods for computational storage functions for computation storage devices.

BACKGROUND

The present background section is intended to provide context only, and the disclosure of any concept in this section does not constitute an admission that said concept is prior art.

With advances in technology, the size and amount of data is increasing rapidly as data is collected by devices such as mobile devices, Internet of things devices, aerial (remote sensing) devices, software logs, cameras, microphones, radio-frequency identification (RFID) readers, wireless sensor networks, and the like. To process and use information represented by the collected data, storage devices, processing elements, and servers are often used in datacenters to filter, compute, store, and perform related operations on the data. A need remains for systems and methods that improve computational functions in storage devices.

The above information disclosed in this Background section is only for enhancement of understanding of the background of the disclosure and therefore it may contain information that does not constitute prior art.

SUMMARY

In various embodiments, described herein include systems, methods, and apparatuses for data transfers for computation storage devices. In particular, a method for managing functions is disclosed. The method can include: determining one or more functions associated with a first device and determining one or more corresponding function types for the functions; grouping the functions based on the function types using a group name; and providing the group name to a second device for use in connection with an associated application, where the first device includes a computational storage (CS) device.

In some respects, the method further includes determining one or more properties associated with the functions and determining corresponding second function types based on the properties, where the one or more properties include a power usage or a computational load associated with at least one function of the functions. In other respects, the method further includes grouping the functions based on the second function types. In some respects, the providing the group name to the second device includes advertising the group name to a host device. In various aspects, a user uses the functions by communicating with the first device via the group name via the application. In some respects, the determining one or more functions associated with a first device includes transmitting information via an interface between the first device and the second device, and where the interface includes an application programming interface (API). In other respects, the CS device includes a non-volatile memory express (NVMe) enabled storage device or an NVMe-over-Fabric (NVMe-oF) enabled storage device. In some respects, where the method further includes establishing a connection between the first device and the second device, the establishing further including a discovery process. In various respects, where the determining the one or more functions associated with a first device and determining one or more corresponding function types is based on a hint generated by the second device.

A system for managing functions is disclosed. The system can include: a host device including a first memory and an application; a storage device including a processing element, and a second memory; where the system stores computer-executable instructions which, when executed by a processor, cause the processor to perform operations including: determining one or more functions associated with the storage device and determining one or more corresponding function types for the functions; grouping the functions based on the function types using a group name; and providing the group name to the host device for use in connection with an associated application, where the storage device includes a computational storage (CS) device.

In some respects, the operations further include: determining one or more properties associated with the functions and determining corresponding second function types based on the properties, where the one or more properties include a power usage or a computational load associated with at least one function of the functions. In other respects, the operations further include: grouping the functions based on the second function types. In additional respects, the providing the group name to the host device includes advertising the group name to the host device. In some respects, the determining one or more functions associated with the storage device includes transmitting information via an interface between the storage device and the host device, and where the interface includes an application programming interface (API). In various respects, the CS device includes a non-volatile memory express (NVMe) enabled storage device or an NVMe-over-Fabric (NVMe-oF) enabled storage device. In some respects, the determining the one or more functions associated with the storage device and determining one or more corresponding function types is based on a hint generated by the host device.

A computer-readable medium is disclosed. The computer-readable medium can store instructions that, when executed by a computer, cause the computer to perform operations including: determining one or more functions associated with a first device and determining one or more corresponding function types for the functions; grouping the functions based on the function types using a group name; and providing the group name to a second device for use in connection with an associated application, where the storage device includes a computational storage (CS) device. In some respects, the operations further includes: determining one or more properties associated with the functions and determining corresponding second function types based on the properties, where the one or more properties include a power usage or a computational load associated with at least one function of the functions. In other respects, the operations further includes: grouping the functions based on the second function types and the providing the group name to the second device includes advertising the group name to a host device.

Similarly, non-transitory computer-readable media, devices, and systems for performing substantially the same or similar operations as described above are further disclosed.

Accordingly, particular embodiments of the subject matter described herein can be implemented so as to realize one or more of the following advantages. Reduce network latencies and improve network stability and operational data transfer rates and, in turn, improve the user experience. Reduce costs associated with routing network traffic, network maintenance, network upgrades, and/or the like. Further, in some aspects, the disclosed systems can serve to reduce the power consumption and/or bandwidth of devices on a network, and may serve to increase the speed and/or efficiency of communications between devices. Moreover, the disclosed systems and methods can serve to provide a seamless mechanism that works for direct-attached and network-attached drives. In another aspect, the disclosed mechanisms can provide scaling of functions since the functions can be organized under a common name and/or identifier. Further, the disclosed mechanisms can be applied to a computational storage device (e.g., a storage device having a processing functionality) and related systems. In other aspects, the disclosed systems can be used in connection with any suitable storage device such a non-volatile memory express (NVMe), an NVMe-over fabric (NVMe-oF), and/or non-NVMe solid state drives (SSDs). Further, the disclosed systems and methods can be standardized and applied to a range of storage devices and related systems while being agnostic to vendor.

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 4 shows a schematic diagram of a computational storage functional group that can be used in association with computational storage devices, according to embodiments of the disclosure.

FIG. 5 is an illustration of an exemplary operational flow illustrating example operations associated with the disclosed systems, in accordance with example embodiments of the disclosure.

Figure 1:
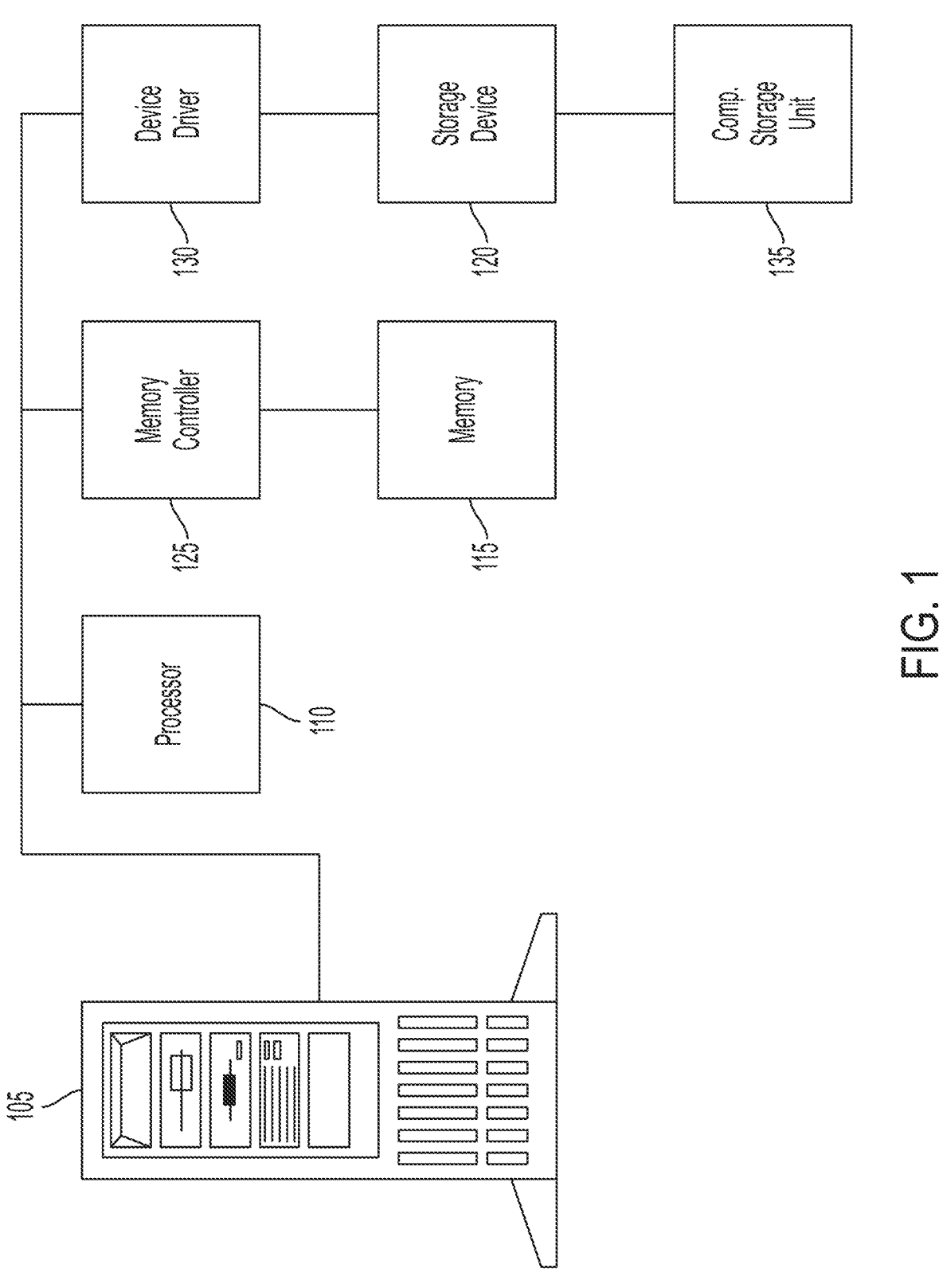
FIG. 1 shows a system including a computational storage unit that supports maintenance on a storage device, according to embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMe-dia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resis-tive random-access memory (RRAM), Silicon-Oxide-Ni-tride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory compo-nent (DIMM), single in-line memory component (SIMM), video random access memory (VRAM), cache memory (including various levels), flash memory, register memory, and/or the like. It will be appreciated that where embodi-ments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present dis-closure may take the form of an apparatus, system, com-puting device, computing entity, and/or the like executing instructions stored on a computer-readable storage medium to perform certain steps or operations. Thus, embodiments of the present disclosure may also take the form of an entirely hardware embodiment, an entirely computer pro-gram product embodiment, and/or an embodiment that com-prises combination of computer program products and hard-ware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like car-rying out instructions, operations, steps, and similar words used interchangeably (for example the executable instruc-tions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various com-binations of embodiments for performing the specified instructions, operations, or steps.

In various aspects, computational storage (CS) devices (also referred to as near-storage computing devices) can serve to enhance storage functionality uses, for example, by performing near-storage acceleration operations. CS devices can include storage element that provides functions known as computational storage functions (CSFs) and persistent data storage. Non-limiting examples of CSFs can include functions providing compression, encryption, Database fil-ter, erasure coding, redundant array of inexpensive disks (RAID), hashing and cyclic redundancy check (CRC) opera-tions, regular expression (RegEx) operations (e.g., for pat-tern matching), scatter gather, pipeline, video compression, data deduplication, and/or large data set management. Fur-ther, computational storage devices can include computa-tional storage engines, which can include components (e.g., hardware components such as CPUs, FPGAs, etc.) that are able to execute one or more CSFs. In various aspects, the computational storage devices can communicate with and be controlled at least in part by another device such as a host. The host can include a computer system to which disks, disk subsystems, or file servers are attached and accessible for data storage and input/output (I/O).

In various aspects, the disclosed systems are directed to systems and methods for interacting efficiently with CSFs. In some respects, CSFs may also be referred to as compu-tational storage programs in certain technological contexts, such as that associated with certain standards like non-volatile memory express (NVMe). In some respects, there can be one or more copies of same CSF on a given CS device or group of CS devices (e.g., in a system of CS devices). These copies can be used, for example, to run multiple threads or to satisfy large task by breaking down into smaller tasks run in parallel (e.g., decompression, encryption, par-allelization of tasks, and/or the like). The disclosed systems can thus provide a mechanism to organize and name such CSFs such that a user and a corresponding user device can interact with the CSFs using a common name and associated organizational framework, as described further herein.

In some aspects, a computational storage engine such as FPGAs can contain multiple instances of a given CSF for use in association with a corresponding kernel. That is, the FPGA build tools can generate multiple instances of a given CSF and can load it for use. However, for such devices as FPGAs, because the way the kernels are configured, the CSFs may not obtain certain grouping and/or naming, for example, once the number of functions exceeds a certain predetermined number. Further, the duplicate functions may receive additional names (e.g., "function 1" and "function2") instead of a more global identifier (e.g., "function") to refer to the various instances. As another example, a user may be using eight functions that have similar scope and functionality that should have a single name (e.g., "function"), and because of the specific kernel configuration of a device such as an FPGA, the user may need to split the naming of the eight functions into two groups of functions (e.g., sub-functions 1-4 for a first group "function 1" and another four sub-functions 1-4 for a second group "function2"). Further, the user may need to have this information and provide this information to enable various interactions with system devices (e.g., the host and/or CS devices) in software ahead of time. Such a naming convention can cause various limitation of tools and builds for different devices in association with CS.

For more advanced usages, similar issues can occur where an implementation of a group of CS functions may have different names but have similar utility (e.g., same outputs for same inputs); however, the way the CS functions are built can be different (e.g., they may use different resources, have different power usage, computational loads, and/or the like). However, since the CS devices and associated protocols may be implementing a corresponding mechanism to handle grouping of such similar CS functions with different profiles, so different names may need to be assigned for all the CS functions, which can increase the difficulty of use and associated overhead associated with the multiple instances of the same function with different names.

In various aspects, the disclosed systems can enable the grouping of CSFs, and can enable interoperability with various types of hardware or software builds. Further, the disclosed systems can enable the creation of a group in a host software or in a CS device and can expose the group to a user under a common naming convention (e.g., "function" rather than "function1" and "function2"). In other aspects, the host software can expose the group and the user can use the functions (e.g., multiple functions under the same name) simultaneously or can queue them. For example, the user can run four functions for a first group of functions named "function1" and another four functions for a second group of functions named "function2" simultaneously, while the host can manage and map the eight functions to the group name "function".

Accordingly, the disclosed systems include a mechanism to group a set of function instances regardless of their individual identifiers under one identifier and manage this identifier to the host so that host application and associated user can use and run with one name or an identifier or notation. In this manner, the disclosed systems can enable a host-based software grouping mechanism that maps the functions to the underlying hardware and executes the functionality. Further, the disclosed systems can create a mapping between one function and many sub-functions (and other functions having the same or similar functionality).

In various aspects, the disclosed systems can be used in connection with a variety of different devices including application-specific integrated circuits (ASICs), FPGAs, and the like in addition to various software modules. For example, a user can provide a name like "compression64" or "compression32" for accessing different functions for compression in different formats.

Further, the disclosed system can enable the use of different instances of CSFs in association with hardware or software. Moreover, the implementation of a given sub-function can have a different name, but the grouping mechanism can correlate that sub-function to a known name/identifier that the user can configure. Further, the disclosed systems can enable the implementation of various hardware functionality while providing a mapping of a given function to the hardware. For example, the disclosed systems can retain an old version and a new version of a given function, each configured to operate on different hardware elements and the functions can have different names; however, the disclosed systems can enable a common grouping and corresponding mapping and can provide an abstraction to the user using a given group name.

The disclosed systems can operate at a system level (e.g., a host level) and at a more granular level (e.g., device level). At the host level, the disclosed systems can include a mechanism for grouping and mapping various functions to corresponding hardware elements (e.g., an FPGA, a data processing unit (DPU), a tensor processing unit (TPU), and the like) or various software modules (e.g., software modules written in Python, etc.).

FIG. 1 shows a system including a computational storage unit that supports various functions (e.g., CSFs) on a storage device, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for case of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130.

Storage device 120 may be associated with computational storage unit 135. As discussed below with reference to FIGS. 3A-3D, computational storage unit 135 may be part of storage device 120, or it may be separate from storage device 120. The phrase "associated with" is intended to cover both a storage device that includes a computational storage unit and a storage device that is paired with a computational storage unit that is not part of the storage device itself. In other words, a storage device and a computational storage unit may be said to be "paired" when they are physically separate devices but are connected in a manner that enables them to communicate with each other.

In addition, the connection between storage device 120 and paired computational storage unit 135 might enable the two devices to communicate, but might not enable one (or both) devices to work with a different partner: that is, storage device 120 might not be able to communicate with another computational storage unit, and/or computational storage unit 135 might not be able to communicate with another storage device. For example, storage device 120 and paired computational storage unit 135 might be connected serially (in either order) to a fabric such as a bus, enabling computational storage unit 135 to access information from storage device 120 in a manner another computational storage unit might not be able to achieve.

Processor 110 and storage device 120 may be connected to a fabric. The fabric may be any fabric along which information may be passed. The fabric may include fabrics that may be internal to machine 105, and which may use interfaces such as Peripheral Component Interconnect Express (PCIe), Serial AT Attachment (SATA), Small Computer Systems Interface (SCSI), among others. The fabric may also include fabrics that may be external to machine 105, and which may use interfaces such as Ethernet, Infini-Band, or Fibre Channel, among others. In addition, the fabric may support one or more protocols, such as Non-Volatile Memory (NVM) Express (NVMe), NVMe over Fabrics (NVMe-oF), or Simple Service Discovery Protocol (SSDP), among others. Thus, the fabric may be thought of as encompassing both internal and external networking connections, over which commands may be sent, either directly or indirectly, to storage device 120 (and more particularly, the computational storage unit associated with storage device 120).

While FIG. 1 shows one storage device 120 and one computational storage unit 135, there may be any number (one or more) of storage devices, and/or any number (one or more) of computational storage units in machine 105.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. In addition, while the discussion above (and below) focuses on storage device 120 as being associated with a computational storage unit, embodiments of the disclosure may extend to devices other than storage devices that may include or be associated with a computational storage unit. Any reference to "storage device" above (and below) may be understood as also encompassing other devices that might be associated with a computational storage unit.

The host may be implemented with any type of apparatus that may be configured as a host including, for example, a server such as a compute server, a storage server, storage node, a network server, and/or the like, a computer such as a workstation, a personal computer, a tablet, a smartphone, and/or the like, or any combination thereof. The device may be implemented with any type of apparatus that may be configured as a device including, for example, an accelerator device, a storage device, a network device, a memory expansion and/or buffer device, a graphics processing unit (GPU), a neural processing unit (NPU), a tensor processing unit (TPU), and/or the like, or any combination thereof.

Any communication between devices (e.g., host, CS device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, Infini-Band, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, the system illustrated herein may include one or more additional apparatus having one or more additional communication interfaces.

In an embodiment in which the device is implemented as a storage device, the storage device may include any type of nonvolatile storage media based, for example, on solid state media (e.g., a solid state drive (SSD)), magnetic media (e.g., a hard disk drive (HDD)), optical media, and/or the like, or any combination thereof. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof. Any such storage device may be implemented in any form factor such as 3.5 inch, 2.5 inch, 1.8 inch, M.2, Enterprise and Data Center SSD Form Factor (EDSFF), NF1, and/or the like, using any connector configuration such as SATA, SCSI, SAS, U.2, M.2, and/or the like. Any such storage device may be implemented entirely or partially with, and/or used in connection with, a server chassis, server rack, dataroom, datacenter, edge datacenter, mobile edge datacenter, and/or any combinations thereof.

Any of the functionality described herein, including any of the host functionality, device functionally, and/or the like, may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), graphics processing units (GPUs), neural processing units (NPUs), tensor processing units (TPUs) and/or the like, executing instructions stored in any type of memory. In some embodiments, one or more components may be implemented as a system-on-chip (SOC).

Figure 2:
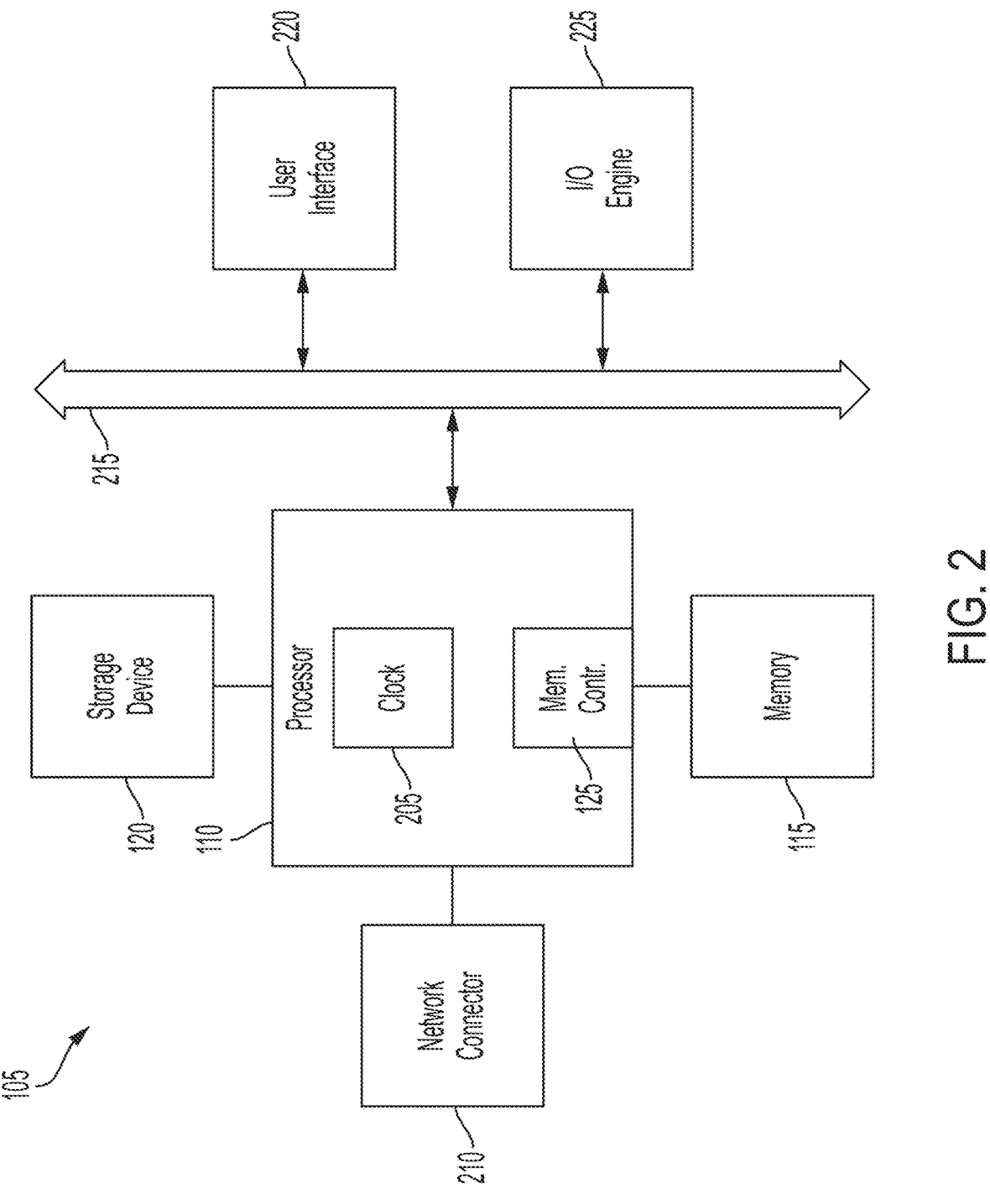
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
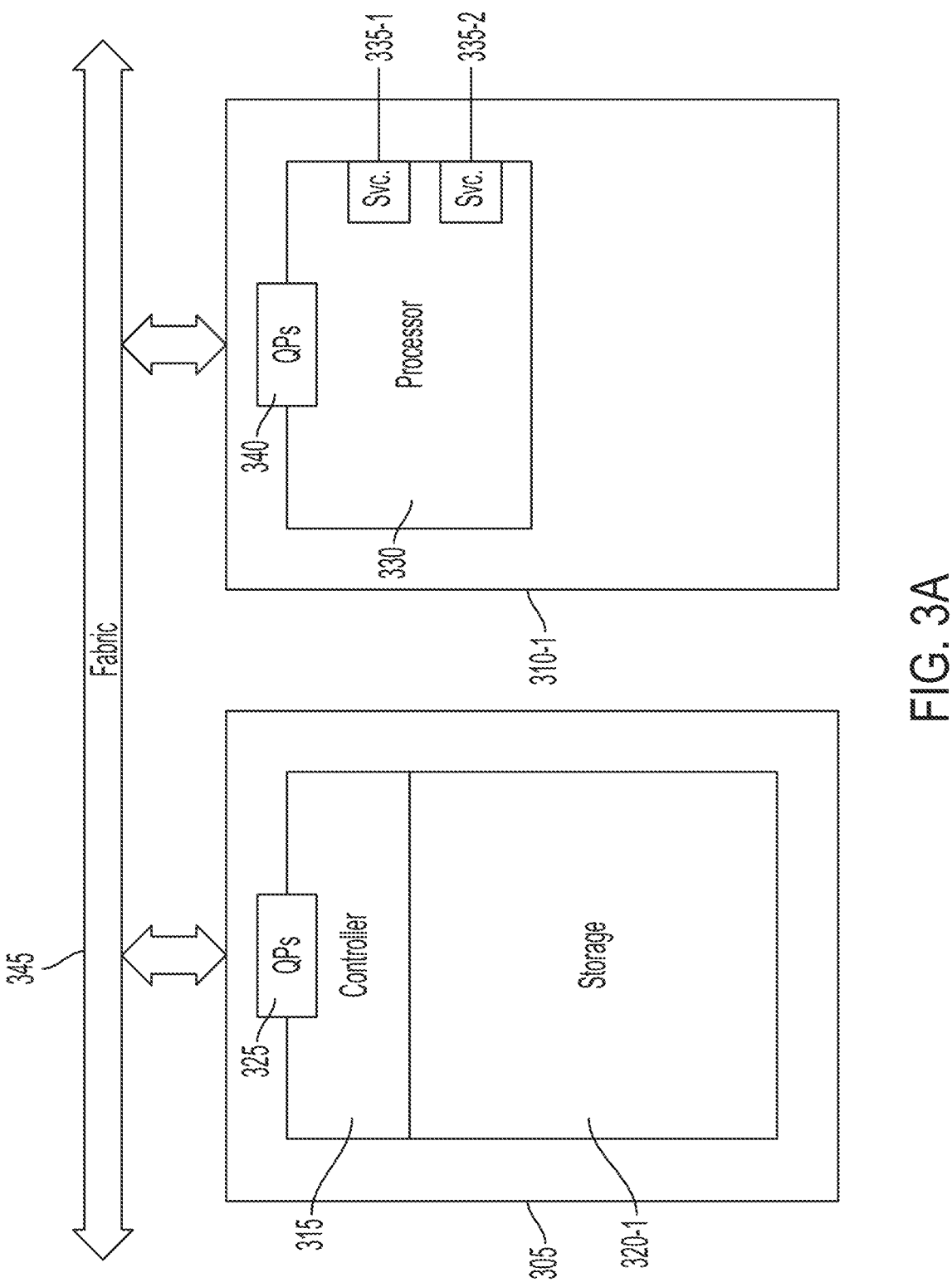
FIG. 3A shows a first example arrangement of a computational storage unit that may be associated with the storage device of FIG. 1, according to embodiments of the disclosure.

FIGS. 3A-3D show various arrangements of computational storage unit 135 of FIG. 1 (which may also be termed a "computational device" or "device") that may be associated with storage device 120 of FIG. 1, according to embodiments of the disclosure. In FIG. 3A, storage device 305 and computational device 310-1 are shown. Storage device 305 may include controller 315 and storage 320-1, and may be reachable across queue pairs: queue pairs 325 may be used both for management of storage device 305 and to control I/O of storage device 305. Computational device 310-1 may be paired with storage device 305.

Computational device 310-1 may include any number (one or more) processors 330, which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Each processor 330 may be a single core processor or a multi-core processor. Computational device 310-1 may be reachable across queue pairs 340, which may be used for both management of computational device 310-1 and/or to control I/O of computational device 310-1

Processor(s) 330 may be thought of as near-storage processing: that is, processing that is closer to storage device 305 than processor 110 of FIG. 1. Because processor(s) 330 are closer to storage device 305, processor(s) 330 may be able to execute commands on data stored in storage device 305 more quickly than for processor 110 of FIG. 1 to execute such commands. While not shown in FIG. 3A, processor(s) 330 may have associated memory which may be used for local execution of commands on data stored in storage device 305. This associated memory may include local memory similar to memory 115 of FIG. 1, on-chip memory (which may be faster than memory such as memory 115, but perhaps more expensive to produce), or both.

While FIG. 3A shows storage device 305 and computational device 310-1 as being separately reachable across fabric 345, embodiments of the disclosure may also include storage device 305 and computational device 310-1 being serially connected (as shown in FIG. 1). That is, commands directed to storage device 305 and computational device 310-1 might both be received at the same physical connection to fabric 345 and may pass through one device to reach the other. For example, if computational device 310-1 is located between storage device 305 and fabric 345, computational device 310-1 may receive commands directed to both computational device 310-1 and storage device 305: computational device 310-1 may process commands directed to computational device 310-1, and may pass commands directed to storage device 305 to storage device 305. Similarly, if storage device 305 is located between computational device 310-1 and fabric 345, storage device 305 may receive commands directed to both storage device 305 and computational device 310-1: storage device 305 may process commands directed to storage device 305 and may pass commands directed to computational device 310-1 to computational device 310-1.

Services 335-1 and 335-2 may offer a number of different functions (e.g., CSFs) that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also any combination of such functions.

Table 1 lists some examples of services that may be offered by processor(s) 330.

TABLE 1

| Service Types |
|---|
| Compression |
| Encryption |
| Database filter |
| Erasure coding |
| RAID |
| Hash/CRC |
| RegEx (pattern matching) |
| Scatter Gather |
| Pipeline |
| Video compression |
| Data deduplication |
| Operating System Image Loader |
| Container Image Loader |
| Berkeley packet filter (BPF) loader |
| FPGA Bitstream loader |
| Large Data Set |

Processor(s) 330 (and, indeed, computational device 310-1) may be implemented in any desired manner. Example implementations may include a local processor, such as Central Processing Unit (CPU) or some other processor, a Graphics Processing Unit (GPU), a General Purpose GPU (GPGPU), a Data Processing Unit (DPU), a Tensor Processing Unit (TPU), or a Neural Processing Unit (NPU), among other possibilities. Processor(s) 330 may also be implemented using a Field Programmable Gate Array (FPGA) or an Application-Specific Integrated Circuit (ASIC), among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Figure 3B:
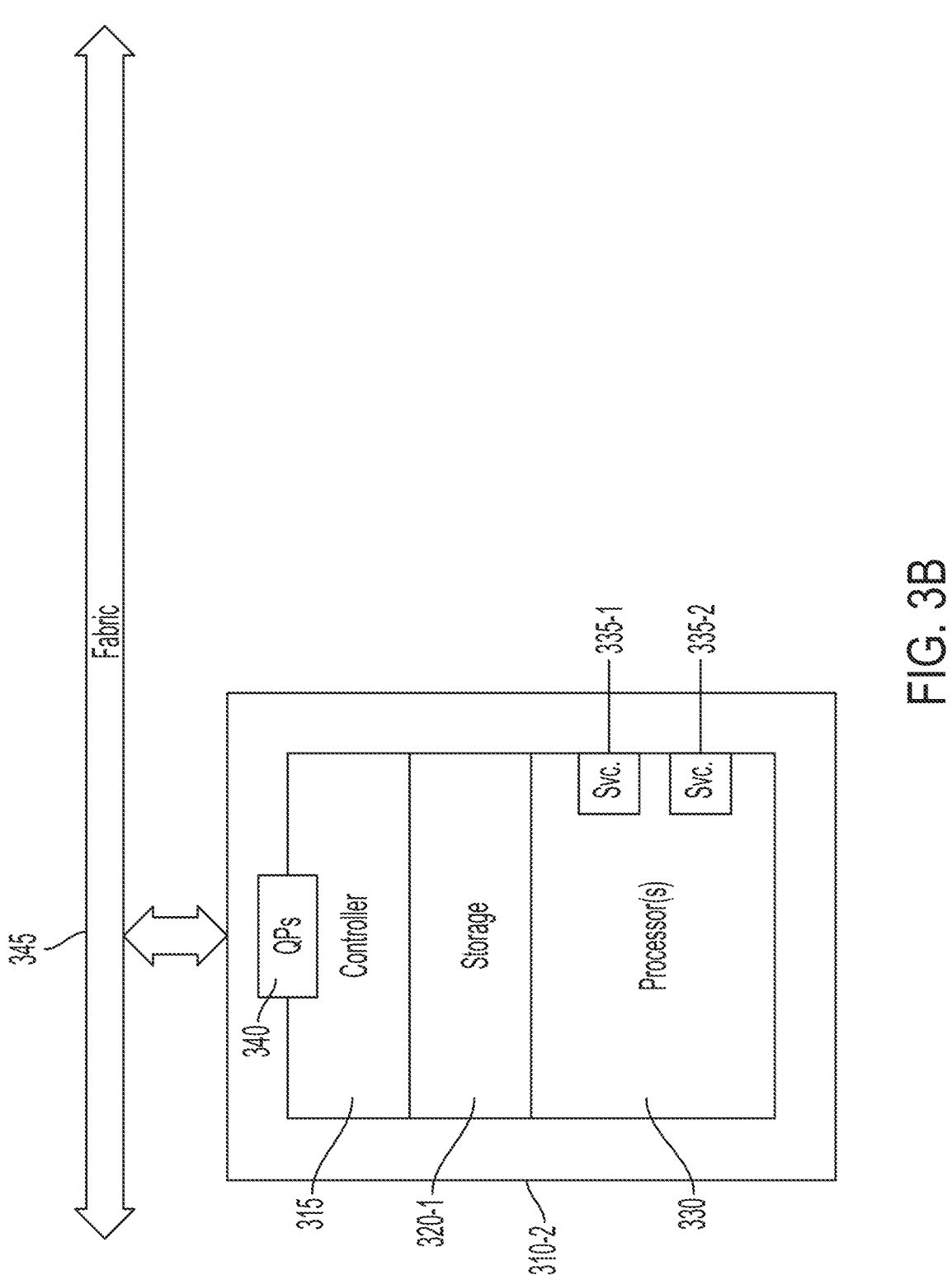
FIG. 3B shows a second example arrangement of a computational storage unit that may be associated with the storage device of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, and processor(s) 330 offering services 335-1 and 335-2. As with storage device 305 and computational device 310-1 of FIG. 3A, management and I/O commands may be received via queue pairs 340. Even though computational device 310-2 is shown as including both storage and processor(s) 330, FIG. 3B may still be thought of as including a storage device that is associated with a computational storage unit.

Figure 3C:
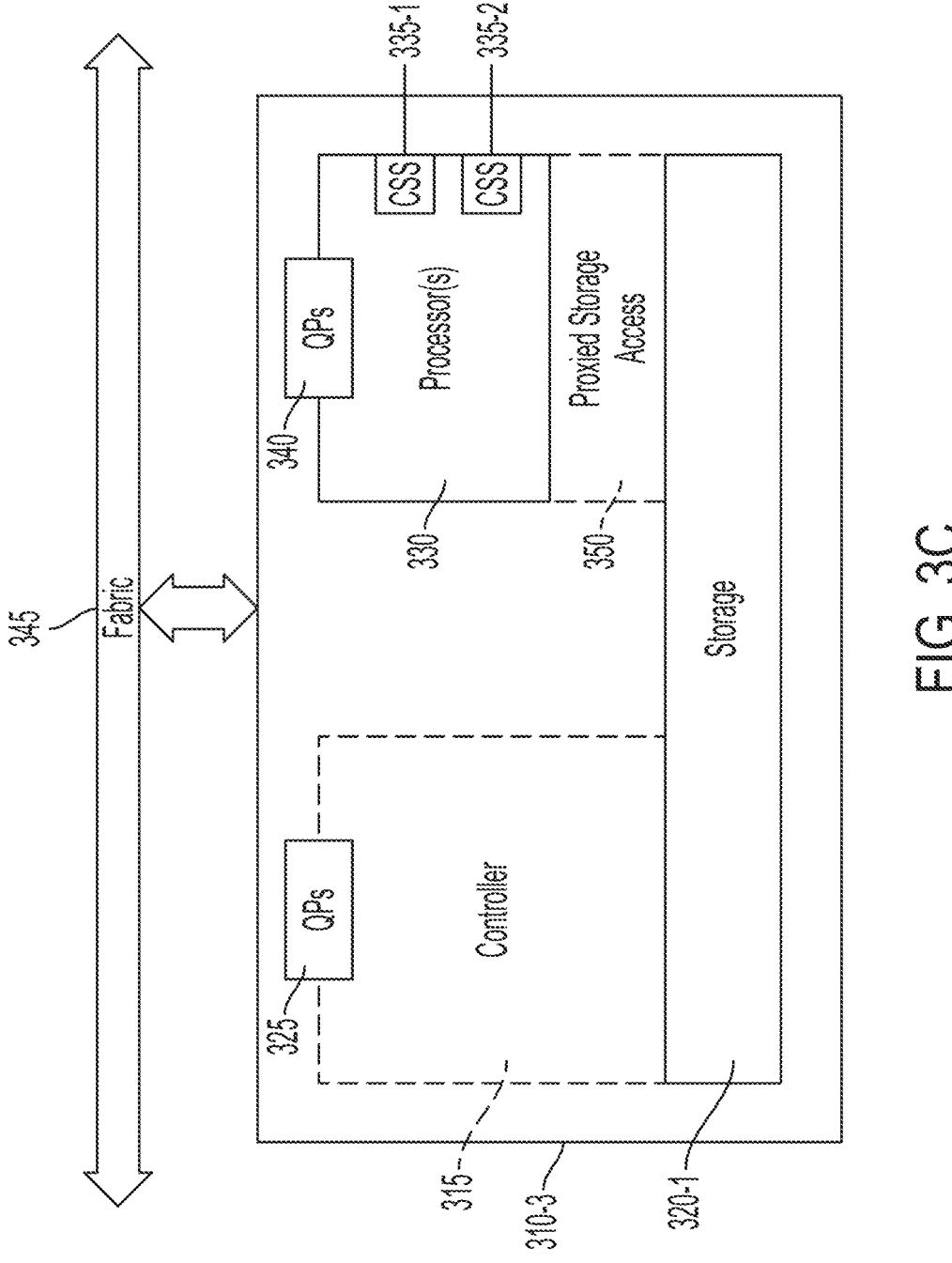
FIG. 3C shows a third example arrangement of a computational storage unit that may be associated with the storage device of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2. But even though computational device 310-3 may be thought of as a single component including controller 315, storage 320-1, and processor(s) 330 (and also being thought of as a storage device associated with a computational storage unit), unlike the implementation shown in FIG. 3B controller 315 and processor(s) 330 may each include their own queue pairs 325 and 340 (again, which may be used for management and/or I/O). By including queue pairs 325, controller 315 may offer transparent access to storage 320-1 (rather than requiring all communication to proceed through processor(s) 330).

In addition, processor(s) 330 may have proxied storage access 350 to storage 320-1. Thus, instead of routing access requests through controller 315, processor(s) 330 may be able to directly access the data from storage 320-1.

In FIG. 3C, both controller 315 and proxied storage access 350 are shown with dashed lines to represent that they are optional elements, and may be omitted depending on the implementation.

Figure 3D:
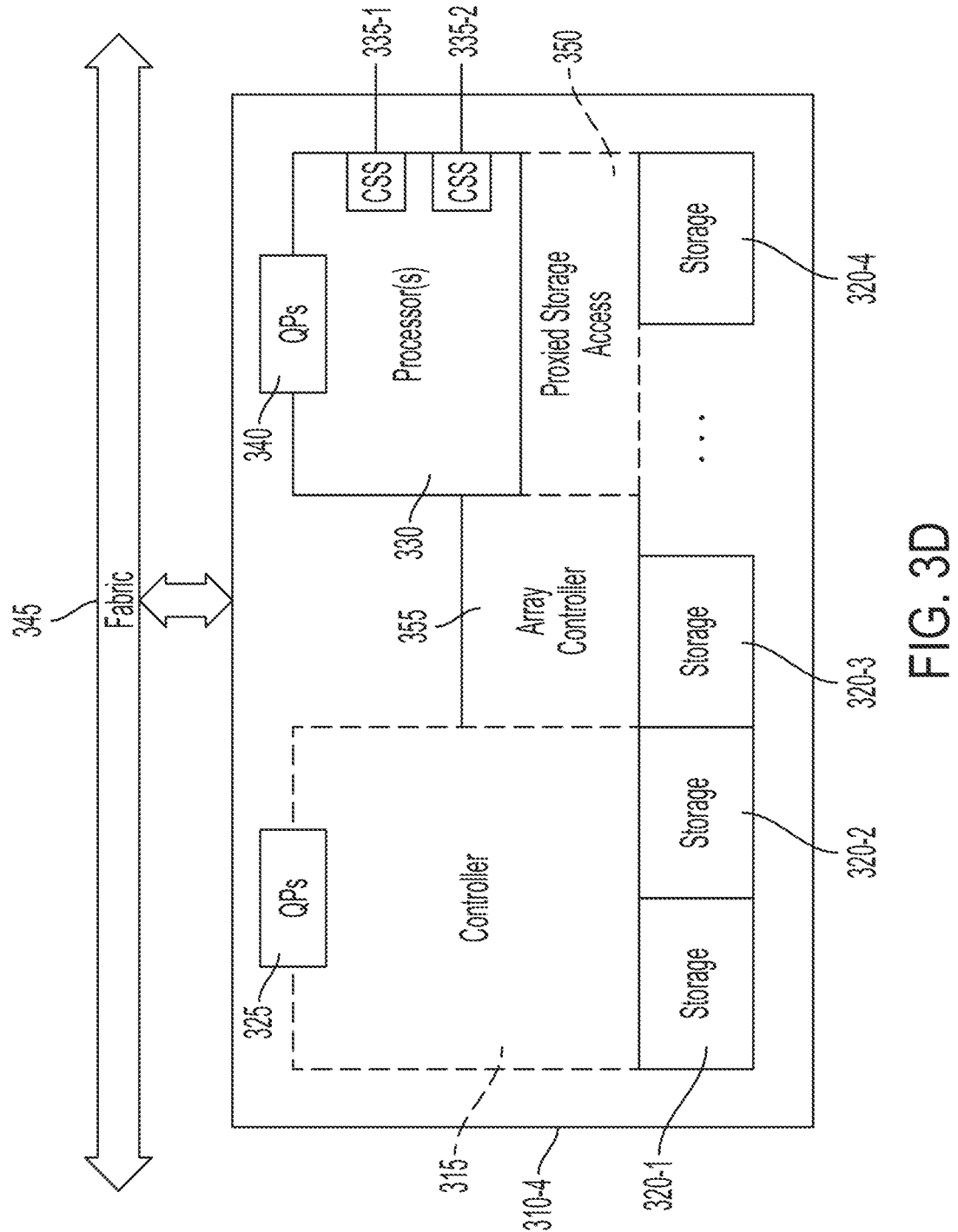
FIG. 3D shows a fourth example arrangement of a computational storage unit that may be associated with the storage device of FIG. 1, according to embodiments of the disclosure.

Finally, FIG. 3D shows yet another implementation. In FIG. 3D, computational device 310-4 is shown, which may include controller 315 and proxied storage access 350 similar to FIG. 3C. In addition, computational device 310-4 may include an array of one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 355. Array controller 355 may manage how data is stored on and retrieved from storage elements 320-1 through 320-4. For example, if storage elements 320-1 through 320-4 are implemented as some level of a Redundant Array of Independent Disks (RAID), array controller 355 may be a RAID controller. If storage elements 320-1 through 320-4 are implemented using some form of Erasure Coding, then array controller 355 may be an Erasure Coding controller.

As noted above, the disclosed systems can implement computational storage (CS) which can further include various architectures that provide computational storage functions (CSFs) coupled to storage, offloading host processing or reducing data movement. In some aspects, these architectures can enable improvements in application performance and/or infrastructure efficiency through the integration of compute resources (outside of the traditional compute & memory architecture) either directly with storage or between the host and the storage. Further, such architectures can be used by the disclosed systems to enable parallel computation and/or to alleviate constraints on existing compute, memory, storage, and I/O.

Some embodiments may implement a mechanism to use computational storage functions in one or more devices. In some embodiments, one or more functions (e.g., known functions, standardized functions, and/or the like) may be advertised, for example, in a location which may be accessed by users of, and/or communities that may use, computational storage, Nonvolatile Memory Express (NVMe), and/or the like. In some embodiments, a database may be published which may provide as output one or more functions, for example, in response to a query.

In some embodiments, a function may include any number of the following definitions, features, and/or the like. A function (e.g., a well-known function) identification (ID) format, for example, a universally unique identifier (UUID). A definition of a specific compute function, for example, by ID. In some embodiments, a function may not be specified by name. In some embodiments, a name which may include a description may be provided as a convenience, for example, compression, CompX, LZW (for a Lempel-Ziv-Welch algorithm), LZ77 (for an LZ77 algorithm), snappy, LZ78 (for an LZ78 algorithm), LZ4 (for an LZ4 algorithm), and/or the like. A definition of one or more specific input and/or output parameters of the function. A definition of one or more status values and/or how the values may be passed back to the caller. A description of one or more details, for example, one or more additional details on the implementation for performance, power, latency, security, resource utilization (e.g., device memory, and/or the like), scheduling, hardware, and/or the like. In some embodiments, a function may denote any compute type that may encompass storage, network, and/or compute type services, and/or the like.

In addition to known functions (e.g., well-known functions), one or more custom function definitions may be provided by users, providers (e.g., vendors), and/or the like, that also use the same or a similar format (e.g., a UUID of any type that may uniquely identify one or more of these functions that may be defined by users, providers, and/or the like. In some embodiments, one or more functions may be advertised in a proprietary manner, e.g., from a provider to an end-user.

In some embodiments, any of these function type classifications may be differentiated by any indicia, for example, a bit in the function ID. For example, provider-defined bit or bits be set for custom functions.

In some embodiments, one or more computational storage (CS) application programming interfaces (APIs) may provide a query mechanism, for example, to discover one or more compute functions in a device that may be preloaded by a provider, downloaded later by a user, or in any other manner. A list of these functions may be provided to a user and described, for example, using a list of function IDs. Additional query functionality may be provided, for example, that may provide details on one or more functions, input and/or output parameters and/or status values for the function, and/or the like. One or more APIs may be used by the disclosed systems communicate with computational storage devices that are equipped with these functions and have the ability to initialize, execute, stop, reset, download, load, and/or unload these functions and/or the like. In some situations, the same function may be resident on one or more devices at the same time. One or more APIs may provide the classification to differentiate functions and/or their features at the query and/or execution level.

In some embodiments, a device such as an NVMe device that is enabled for CS may provide an interface to query, download, initialize, load, unload, stop, reset, and/or run these functions, and/or the like. A device may provide different mechanisms for these functions to run, e.g., embedded central processing unit (CPU), dedicated hardware application specific integrated circuit (ASIC), field programmable gate array (FPGA), graphics processing unit (GPU), and/or the like. A device may provide one or more log pages, for example, to query details on these functions that may include, for example, textual description, number of concurrent units, and/or the like.

In some embodiments, one or more of the disclosed mechanisms may be transparent across network fabric types on usage. In some embodiments, one or more of the disclosed mechanisms may work for host based implementation that may or may not be supported by CS. In some embodiments, if no ID is provided, then a library and/or a tool may create one dynamically for the same purpose. Some example embodiments of functions that may be standardized may include a cyclic redundancy check (CRC) (e.g., CRC32), a secure hash algorithm (SHA) (e.g., SHA-256), a message-digest (MD) algorithm (e.g., MD5), a search string, and/or the like. In some embodiments, a provider may provide additional details on the implementation of a function, for example, performance, power, latency, security, resource utilization (e.g., device memory and/or the like), scheduling, hardware, and/or the like. In some embodiments, a device may provide a dynamic load balancer and/or a switcher to run on a specific hardware type or which may be chosen by the user in certain implementations.

In some embodiments, one or more FPGA tools use during creation of a bitstream may not fit more than a certain number (e.g., 12) of copies (which may also be referred to as instances) of the same function logic for a given name. This may be due, for example, to one or more limitations of the tool or the logic routing implementation. In some embodiments, an API may provide a grouping feature that may include an option to group similar functions together even when their names or identifications are different. In some embodiments, CS APIs may be based on names and not on IDs. Some embodiments may replace this grouping functionality and/or reduce or eliminate the need or use of these additional APIs.

In some embodiments, computational storage function (CSF) functionality may depend on the implementation of the computational storage engine (CSE) on which it may execute. Since CSEs may be different from one another, a CSF for one type of CSE may not have similar characteristics to a CSF for another type of CSE. For example, CSFs for some CSEs such as an embedded CPU may be able to use one image instance to invoke more than one functional instance to provide parallelism. But that may not be the case with CSFs that may user or require physical image instances to represent more than one functional instance for parallelism (e.g., FPGAs and or hardware ASICs). These CSFs may be represented instead as multiple physical instances when downloaded. In some cases, depending on the tools used to build these CSFs for these CSEs, there may be multiple CSFs that may have the same functionality, but with different names. This may primarily arise as a build limitation, for example, on the maximum parallel CSFs that may be able to fit in a downloadable program for this CSE. In this situation, the user may be made aware of these differences (which may be subtle) in CSFs and their association by names. Depending on the implementation details, scheduling compute jobs to these CSFs may involve the application to understand the limitation of maximum parallelism possible and/or may involve managing these additional CSFs that may have the same functionality individually.

In some embodiments, grouping of CSFs may provide-a user with the ability to associate CSFs with similar functionality together. In some embodiments, this may involve querying some or all of the full list of CSFs using a function such as csQueryDeviceForComputeList( ), and then grouping them together using a function such as csGroupComputeByIds( ), as further described below.

FIG. 4 shows a schematic diagram of a computational storage functional group that can be used in association with computational storage devices, according to embodiments of the disclosure. Diagram 400 shows a schematic of a function group including a first function function 1 404 and a second function function2 408. Further, function 1 404 can include four sub-functions 406 labeled as CSF1-CSF4 and function2 408 can include four sub-functions 410 labeled as CSF1-CSF4.

In some embodiments, from the perspective of an application, using either function may provide the full capability of the group in scheduling compute jobs. If the application chooses function1 and schedules a 5th compute offload job when 4 are already outstanding, the scheduler may use a group hint and may use the capabilities of function2 to schedule the next job. Alternatively, the scheduler may be able to improve or optimize which job to schedule next to each available function as they become free.

In some respects, a hint (such as the hint mentioned above) can be provided by another device such as the host, and can provide information to an interface associated with the disclosed systems indicating that at least two functions (e.g., function1 and function2) are similar even though they have different names. In some respects, the hint can be provided by an API to any suitable device (e.g., a CS device) and the host can determine that the functions are similar. In some aspects, the disclosed systems can determine that at least two functions are similar if given the same inputs, the same outputs will be produced, or if at least some of the outputs are the same or substantially the same. Accordingly, the functions can be similar while the functions' names, identifiers, and the like may vary and even certain parameters associated with the function such as the functions' latencies, power, compute consumption (e.g., load balancing by CPUs/cores, other processing elements, storage requirements, and the like) can be different.

In some embodiments, a call to a function such as csGroupComputeByIds( ) may be a privileged function which may be restricted to applications with administrative rights. This API may be executed, for example, when the system is setup and before any compute jobs are run and may be part of a system policy.

Some examples of usage in accordance with example embodiments of the disclosure may include any of the following:

1. A user may decrypt a data block (e.g., a data block of a certain number x of megabytes). 2. A user may query a database (e.g., a well-known database) for decryption functions that may suite the data to be processed by the function. 3. A user may retrieve a function ID from a database if available. If not available, the user may query a provider database for the same and retrieve the function ID. 4. A user may next query a CS API by function ID for devices that may support the function and/or may be available. 5. A user may load data on a device, set up one or more device buffers, initialize a function if helpful or necessary, and execute the function in the device. (In some embodiments, this may also be performed at a host.) 6. A user may loop through some or all data until decryption is complete.

In some aspects, the disclosed systems can use an example function csQueryDeviceForComputeList( ) or an example function csGetCSFId( ) to determine the CSF details specified by name for scheduling compute offload tasks. In some respects, as noted, grouping of CSFs provides the user the ability to associate CSFs with similar functionality together. This can include the disclosed systems permitting the querying of a list of CSFs using a function such as csQueryDeviceForComputeList( ) and then grouping them together using csGroupComputeByIds( ).From an application's perspective, using either function provides the full group's capability in scheduling compute jobs. For example, as noted, if the application choses function 1 and schedules a 5th compute offload job when 4 are already outstanding, the scheduler can use a group hint and uses the capabilities of function2 to schedule the next job. Alternatively, the scheduler is able to optimize which job to schedule next to each available function as they become free.

In the csGetCSFId( ) example, the function can have the following format (or any similar and suitable format): CS_STATUS csGetCSFId (CS_Dev_HANDLE DevHandle, char *CSFName, int *Length, CSFIdinfo *Buffer); Further, the csGetCSFId can have the following parameters: IN DevHandle (or any other parameter name) that can serve as a Handle to CSx; an IN CSFName parameter (or any other parameter name) that can serve as a pre-specified function name; an IN OUT Length parameter (or any other parameter name) that can serve as a length of Buffer to hold CSFIdInfo details; an OUT Buffer parameter (or any other parameter name) that can serve as a pointer to hold an array of CSFIdInfo data-structures with performance and power details of the CSF if successful.

In various aspects, the csGetCSFId( ) can return one or more data structures (e.g., CSFIdInfo data-structures) in Buffer when the length specified in Length is sufficient to satisfy the request. The CSFName should be a valid name that is available with the CSx as specified by DevHandle. Further, the function can return an error if the specified CSFName is not found. In some respects, if a valid Buffer pointer is specified where the length specified in Length is sufficient, then it is updated with an array of available CSFIdInfo data-structures and Length is updated to the actual length of data returned in Buffer. If the length specified in Length is not sufficient to hold the contents returned in Buffer, then Length is populated with the required length and an error status is returned. An invalid input can return an error status. If a NULL pointer is specified for Buffer and a valid pointer is provided for Length, then the required buffer length is returned in Length. The user can allocate a buffer of the returned length and reissue the request. All input and output parameters may be used for this function. The function can return a Return Value CS_SUCCESS if there are no errors in initializing the function. Otherwise, the function returns an error status of CS_INVALID_ARG, CS_INVALID_OPTION, CS_IN-VALID_HANDLE, CS_INVALID_FUNCTION_NAME, CS_DEVICE_NOT_AVAILABLE (or any other parameter name).

In various aspects, any compute work that needs to be run on a CSx first requires the associated CSFs to be configured. A list of configured CSFs may be queried through csQueryCSFList. This function should be called prior to any compute work being scheduled. The CSFId data field returned is used for scheduling work. The RelativePerformance and RelativePower data fields helps differentiate between multiple CSF instances if received back from this function. The Count data field determines the parallelism available for this CSF.

In other aspects, the csQueryDeviceForComputeList( ) function can serve to query the CSE for its resident CSFs. Functions predefined in the device are returned as an array that will include a count and name. This can be used for both CSE and CSx. The function can have the following format: CS_STATUS csQueryDeviceForComputeList (CS_DEV_HANDLE DevHandle, int *Size, CsFunction-Info *FunctionInfo); Moreover, the function can take the following parameters: IN DevHandle Handle to CSx, IN OUT Size which can serve as a pointer to the size of FunctionInfo buffer.OUT FunctionInfo which can serve as a pointer to a buffer that is able to hold all the functions resident in the CSE. In some respects, the csQueryDevice-ForComputeList( ) can return a list of fixed CSFs that are resident in the CSE if successful. If a NULL pointer is specified for FunctionInfo and a valid pointer is provided for Size, the required buffer size is returned back to the user. The user will have to allocate a buffer of the returned size and issue this call again. In other respects, the function can provide a large enough buffer and query. In some aspects, the function can return a CS_SUCCESS if there are no errors. Otherwise, the function returns an error status of CS_INVALID_ARG, CS_INVALID_OPTION, CS_IN-VALID_HANDLE, CS_NOT_ENOUGH_MEMORY, or CS_DEVICE_NOT_AVAILABLE.

In various aspects, the CSE should be queried before any work item is scheduled. This ensures that a valid function is resident. If the user is sure of such a function by name, then this call may be omitted. The data returned in FunctionInfo is an array of function details. The FunctionId field is able to be used for grouping similar functions together with csGroupComputeByIds( ) if the user chooses to do so since it aids in optimally scheduling the next function. This need may arise only if there is more than one function with a different name but exact same functionality. The NumUnits field provides the user on the level of parallelism available with this CSF. The Name field identifies the function and is able to be used to load and initialize it when work needs to be scheduled.

The field GroupId provides information about grouping of functions that is enabled through the call csGroupCompute-ByIds. This is a hint provided by the caller of this function to help hardware associate similar functions. The function scheduler will use this hint while scheduling compute jobs to be optimal across the different units specified by NumU-nits for each function across groups. Any function used by name in the group will be scheduled using this hint.

The embodiment illustrated herein may be used, for example, with a storage protocol such as Nonvolatile Memory Express (NVMe) which may use an interconnect such as Peripheral Component Interconnect Express (PCIe) and/or NVMe-over-fabric (NVMe-oF) which may use a network such as Ethernet, but the principles are not limited to these protocols, communication techniques, or any other implementation details.

In some respects, a given function may need to be registered with a device and the host software library in order to be accessible and available for grouping and mapping. In other aspects, the function may need to be discovered and registered with a given function library (e.g., an API library). Once registered, the registration of the function can provide information that can permit the host or a device to provide the grouping and mapping. For example, the registration can include information that the function has a given group name and that there can be different instances having various sub-function names (e.g., func1-funcN) such that the disclosed systems can group the function and sub-functions together. For example, for a first computational engine such as an FPGA, two function groups can both be loaded in the FPGA and can have the same exact functionality having multiple instances (e.g., 12 instances). In some respects, the functions and respective multiple instances can run into issues with an FPGA of a different vendor since that the different FPGA can have different support levels and syntactical requirements for the functions. In particular, the disclosed system can include a functional group manager that can perform mapping once the functions are registered. In another respect, functionI can be in ASIC and function 2 can be in a different device (e.g., an FPGA, another processor with corresponding software, etc.). In further examples, the functions can have different performance profiles; for example, function I can have a high performance and function 2 can have a lower performance but better energy savings with respect to function 1. That is, both functions can provide the inputs and outputs as advertised but they can include additional tags to reflect different usage cases. For example, the functions can advertise a given function as including 8 sub-functions, 4 as high-performance oriented, and 4 as energy conserving oriented. That way, a user can have the choice to run the function, and can choose, for example, sub-functions 1-4 for performance or functions 4-8 for energy savings in order to offload a given computational task to the CS devices.

In some respects, as additional devices and/or associated functions are added to a system, the disclosed systems can balance the performance and power usage associated with those functions and their corresponding hardware elements by assigning respective CSF groups for optimization.

In some aspects, various protocols (e.g., NVMe) and some hardware elements (e.g., FPGAs) can have different discovery mechanisms and associated specifics. Accordingly, the disclosed systems can perform operations associated with discovery to determine number of instances of functions and types of devices that are being used to prevent conflicts. Below is provided an example.

In some aspects, the disclosed systems can perform a discovery operation in association with a protocol such as NVMe. In particular, the mechanism for discovery can include the device providing one or more log pages describing device functions. For example, a given log page can include a list of device functions, descriptions, a manner by which the functions advertise, and the number of instances each of the functions. In another aspect, another mechanism for discovery can include using a namespace approach, where a namespace is implemented and when invoked, can return a list of device functions, descriptions, a manner by which the functions advertise, and the number of instances each of the functions. In yet another aspect, the disclosed systems can perform a discovery operation in association with remotely attached devices through a fabric (e.g., via RDMA, NVMe-OF, and/or the like) where the fabric can serve to identify device functions for example, via corresponding log pages.

In some aspects, the disclosed systems can perform a discovery operation in association with a hardware element such as FPGAs and ASICs. In this respect, the disclosed systems can include a build of such operations via the hardware kernels themselves, and the hardware can advertise a set of registers specific to the device. In particular, the set can be configured such that a probe of a particular register can yield information regarding the number of programs and/or functions that are available are available. A further probe of the register can be provided to obtain more details regarding descriptions, the number of instances each of the functions, and/or the like. Further, the disclose systems can provide other registers for offsets to start and/or stop operations associated with the functions, where the functions reside in memory, and/or the like.

Non-limiting examples of functions that can be implemented via the disclosed systems include functions for encryption, decompression, compression, storage services, checksum, and/or the like. Other functions that can be implemented via the disclosed systems can further include functions for data analytics such as those for data-based queries (which can have multiple functions (e.g., 8-16 grouped functions or more) for parallelized execution. database approach like query for unorganized data. multiple functions again. Other applications include database searching, sorting, and the like, where the functions can be offloaded to the device.

FIG. 5 shows a representative flow chart illustrating some example operations associated with the disclosed systems, in accordance with embodiments of the disclosure.

At block 502, the disclosed systems can discover one or more functions associated with a device. As noted above, in some aspects, the disclosed systems can perform a discovery operation in association with a protocol such as NVMe. In yet another aspect, the disclosed systems can perform a discovery operation in association with remotely attached devices through a fabric (e.g., via RDMA, NVMe-oF, and/or the like) where the fabric can serve to identify device functions for example, via corresponding log pages.

In some aspects, the disclosed systems can perform a discovery operation in association with a hardware element such as FPGAs and ASICs. In this respect, the disclosed systems can include a build of such operations via the hardware kernels themselves, and the hardware can advertise a set of registers specific to the device. In particular, the set can be configured such that a probe of a particular register can yield information regarding the number of programs and/or functions that are available are available. A further probe of the register can be provided to obtain more details regarding descriptions, the number of instances each of the functions, and/or the like. Further, the disclose systems can provide other registers for offsets to start and/or stop operations associated with the functions, where the functions reside in memory, and/or the like.

At block 504, the disclosed systems can create list of the functions. In particular, the list of functions can be provided by the device based on the discovery process. In particular, the mechanism for discovery can include the device providing one or more log pages describing device functions. For example, a given log page can include a list of device functions, descriptions, a manner by which the functions advertise, and the number of instances each of the functions. In another aspect, another mechanism for discovery can include using a namespace approach, where a namespace is implemented and when invoked, can return a list of device functions, descriptions, a manner by which the functions advertise, and the number of instances each of the functions.

At block 506, the disclosed systems can classify the functions by function type. For example, the disclosed systems can determine that a first function is a power-intensive function, and another is an energy-conserving function. Further, the disclosed systems can determine that the first function is associated with an encryption operation and that the second function is associated with decryption operation, and/or the like. In some respects, the disclosed systems can determine the type of function through a database lookup, a tag associated with the discovery process, and independent query, a test run of the function, combinations thereof, and/or the like.

At block 508, the disclosed systems can group the functions based on the function type. In particular, the disclosed systems can provide a group identifier to the function based on the type. For example, the disclosed systems can call a group of functions (e.g., function1, . . . functionN) associated with encryption operations as EncryptionFunction( ).

At block 510, the disclosed systems can advertise the functions as a second function (e.g., a global function) to a host application. In particular, the disclosed systems can use any suitable protocol (e.g., NVMe, NVMe-oF, etc.) to advertise the capabilities of the functions include the inputs, outputs, performance profile, timing aspects, device requirements, etc. to the host application.

At block 512, the disclosed systems can discover properties associated with the functions and can re-classify the functions based at least in part on those properties. In some respects, the properties can include performance, latency, power, type, etc. tied to the functions. The disclosed systems can monitor these various properties associated with the functions and then re-classify as needed, for example, to provide a more optimized system.

At block 514, the disclosed systems can advertise the properties back to the user. For example, the disclosed systems can provide such information to a user at a user interface associated with a host application. The user can obtain further information as needed by making particular requests in the user interface. The disclosed systems can then relay the request to a corresponding device and/or associated device management application to provide additional details, as available.

At block 516, the disclosed systems can permit a user to choose a given function based on the advertisements and the disclosed systems can provide the function to the user device. Once a selection has been made, the disclosed systems can configure the device, corresponding function, and host application to execute the task as needed in accordance with the proposed function.

Figure 6:
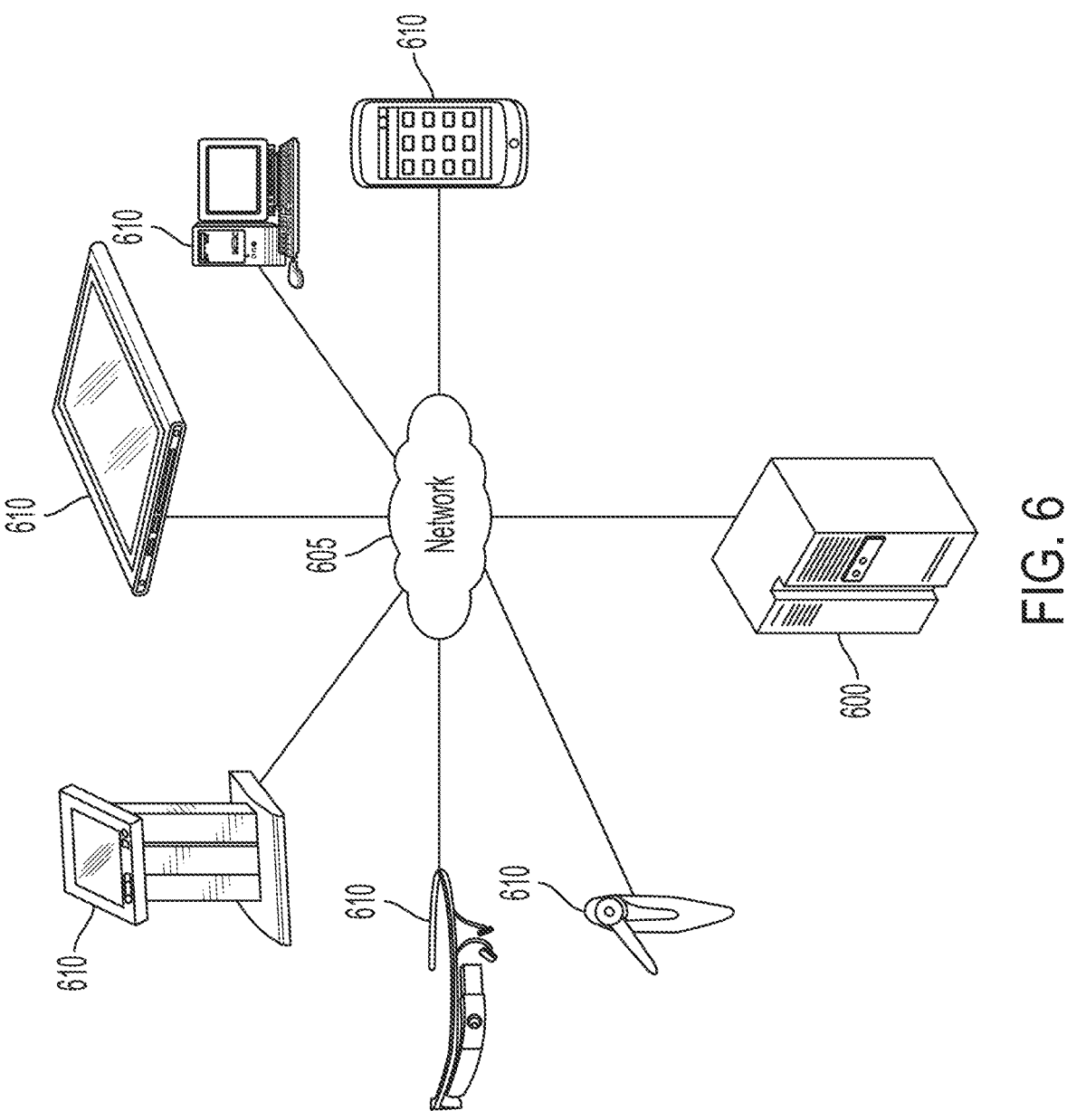
FIG. 6 shows an example schematic diagram of a system that can be used to practice embodiments of the present disclosure.

FIG. 6 shows an example schematic diagram of a system that can be used to practice embodiments of the present disclosure. As shown in FIG. 6, this particular embodiment may include one or more management computing entities 600, one or more networks 605, and one or more user devices 610 (e.g., host devices, storage devices, additional devices, etc.). In various embodiments, the management computing entities 600 can be configured to run operations associated with the disclosed systems and associated embodiments described throughout the disclosure, including, but not limited to, those described in connection with the example operations in FIG. 5. Further, the management computing entities 600 can reside in any suitable portion of the disclosed systems (e.g., such as a storage device manager, host application, a remote host, another device, combinations thereof, and/or the like). Each of these components, entities, devices, systems, and similar words used herein interchangeably may be in direct or indirect communication with, for example, one another over the same or different wired or wireless networks. Additionally, while FIG. 6 illustrates the various system entities as separate, standalone entities, the various embodiments are not limited to this particular architecture. As noted, the communications can be performed using any suitable protocols described further herein.

Figures 7, 8:
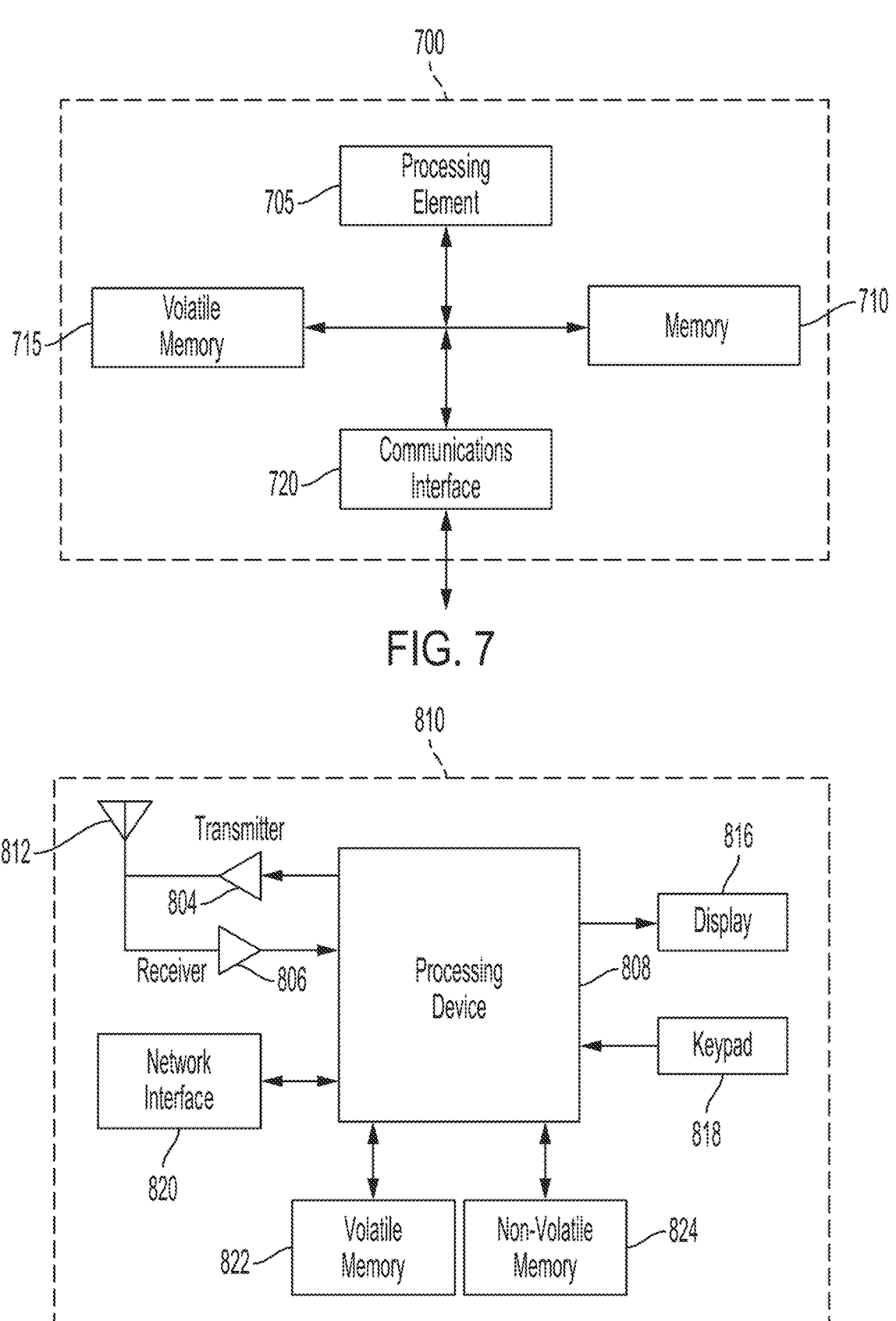
FIG. 7 shows an example schematic diagram of a management computing entity, in accordance with example embodiments of the disclosure.
FIG. 8 shows an example schematic diagram of a user device, in accordance with example embodiments of the disclosure.

FIG. 7 shows an example schematic diagram 700 of a management computing entity, in accordance with example embodiments of the disclosure. As noted, the management computing entity can be configured to run operations associated with the disclosed systems and associated embodiments described throughout the disclosure. Further, the management computing entities 600 can reside in any suitable portion of the disclosed systems. In particular, a content component may serve to determine signals indicative of data (e.g., video, audio, text, data, combinations thereof, and/or the like) to be transmitted over the system described herein. In another embodiment, the determination of the signal for transmission may be, for example, based on a user input to a device, a predetermined schedule of data transmissions on a network associated with the system, changes in network conditions, and the like. In one embodiment, the signal may include that data may be encapsulated in a data frame and/or packet that is configured to be sent from a device to one or more devices on the network.

In another embodiment, the processing element 705 may serve to determine various parameters associated data transmitted over the network associated with the disclosed systems. As another example. the processing element 705 may serve perform various acceleration operations such as at least portions of an offload functionality, data pre- or post-processing, combinations thereof, and/or the like.

In one embodiment, a transmitting component (not shown) may serve to transmit the signal from one device to another device on the network. For example, the transmitting component may serve to prepare a transmitter (e.g., transmitter 604 of FIG. 6, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, car pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 600 may also include one or more communications interfaces 720 for communicating with various computing entities, such as by communicating data, content, information, and/or similar terms used herein interchangeably that can be transmitted, received, operated on, processed, displayed, stored, and/or the like. For instance, the management computing entity 600 may communicate with user devices 610 and/or a variety of other computing entities.

As shown in FIG. 7, in one embodiment, the management computing entity 600 may include or be in communication with one or more processing elements 705 (also referred to as processors, processing circuitry, and/or similar terms used herein interchangeably) that communicate with other elements within the management computing entity 600 via a bus, for example. As will be understood, the processing element 705 may be embodied in a number of different ways. For example, the processing element 705 may be embodied as one or more complex programmable logic devices (CPLDs), microprocessors, multi-core processors, coprocessing entities, application-specific instruction-set processors (ASIPs), microcontrollers, and/or controllers. Further, the processing element 705 may be embodied as one or more other processing devices or circuitry. The term circuitry may refer to an entirely hardware embodiment or a combination of hardware and computer program products. Thus, the processing element 705 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 705 may be configured for a particular use or configured to execute instructions stored in volatile or non-volatile media or otherwise accessible to the processing element 705. As such, whether configured by hardware or computer program products, or by a combination thereof, the processing element 705 may be capable of performing steps or operations according to embodiments of the present disclosure when configured accordingly.

In one embodiment, the management computing entity 600 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 710, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 600 may further include or be in communication with volatile media (also referred to as volatile storage, memory, memory storage, memory circuitry and/or similar terms used herein interchangeably). In one embodiment, the volatile storage or memory may also include one or more volatile storage or memory media 715, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 705. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 600 with the assistance of the processing element 705 and operating system.

As indicated, in one embodiment, the management computing entity 600 may also include one or more communications interfaces 720 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as peripheral component interconnect express (PCIe), fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 600 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, 5G protocol, wireless universal serial bus (USB) protocols, and/or any other wireless protocol.

Although not shown, the management computing entity 600 may include or be in communication with one or more input elements, such as a keyboard input, a mouse input, a touch screen/display input, motion input, movement input, audio input, pointing device input, joystick input, keypad input, and/or the like. The management computing entity 600 may also include or be in communication with one or more output elements (not shown), such as audio output, video output, screen/display output, motion output, movement output, and/or the like.

As will be appreciated, one or more of the management computing entity's 600 components may be located remotely from other management computing entity 600 components, such as in a distributed system. Furthermore, one or more of the components may be combined and additional components performing functions described herein may be included in the management computing entity 600. Thus, the management computing entity 600 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 610 that includes one or more components that are functionally similar to those of the management computing entity 600.

In various aspects, the processing component, the transmitting component, and/or the receiving component (not shown) may be configured to operate on one or more may include aspects of the functionality of the management computing entity 600, as shown and described in connection with FIGS. 6 and 7 here. In particular, the processing component, the transmitting component, and/or the receiving component may be configured to be in communication with one or more processing elements 705, memory 710, volatile memory 715, and may include a communication interface 720 (e.g., to facilitate communication between devices).

FIG. 8 shows an example schematic diagram of a user device, in accordance with example embodiments of the disclosure. FIG. 8 provides an illustrative schematic representative of a user device 810 (e.g., a host device, a storage device, a peripheral device, etc.) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, car pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 810 can be operated by various parties. As shown in FIG. 8, the user device 810 can include an antenna 812, a transmitter 804 (for example radio), a receiver 806 (for example radio), and a processing element 808 (for example CPLDs, FPGAs, microprocessors, multi-core processors, coprocessing entities, ASIPs, microcontrollers, and/or controllers) that provides signals to and receives signals from the transmitter 804 and receiver 806, respectively.

The signals provided to and received from the transmitter 804 and the receiver 806, respectively, may include signaling information in accordance with air interface standards of applicable wireless systems. In this regard, the user device 810 may be capable of operating with one or more air interface standards, communication protocols, modulation types, and access types. More particularly, the user device 810 may operate in accordance with any of a number of wireless communication standards and protocols, such as those described above with regard to the management computing entity 600 of FIG. 6. In a particular embodiment, the user device 810 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, 5G, Wi-Fi, Wi-Fi Direct, WiMAX, UWB, IR, NFC, Bluetooth, USB, and/or the like. Similarly, the user device 810 may operate in accordance with multiple wired communication standards and protocols, such as those described above with regard to the management computing entity 600 via a network interface 820.

Via these communication standards and protocols, the user device 810 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 810 can also download changes, add-ons, and updates, for instance, to its firmware, software (for example including executable instructions, applications, program components), and operating system.

According to one embodiment, the user device 810 may include location determining aspects, devices, components, functionalities, and/or similar words used herein interchangeably. The location determining aspects may be used to inform the models used by the management computing entity and one or more of the models and/or machine learning techniques described herein. For example, the user device 810 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 810 position in connection with a variety of other systems, including cellular towers, Wi-Fi access points, and/or the like. Similarly, the user device 810 may include indoor positioning aspects, such as a location component adapted to acquire, for example, latitude, longitude, altitude, geocode, course, direction, heading, speed, time, date, and/or various other information/ data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 810 may also comprise a user interface (that can include a display 816 coupled to a processing element 808) and/or a user input interface (coupled to a processing element 808). For example, the user interface may be a user application, browser, user interface, and/or similar words used herein interchangeably executing on and/or accessible via the user device 810 to interact with and/or cause display of information from the management computing entity, as described herein. The user input interface can comprise any of a number of devices or interfaces allowing the user device 810 to receive data, such as a keypad 818 (hard or soft), a touch display, voice/speech or motion interfaces, or other input devices. In embodiments including a keypad 818, the keypad 818 can include (or cause display of) the conventional numeric (0-9) and related keys (#, *), and other keys used for operating the user device 810 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 810 can also include volatile storage or memory 822 and/or non-volatile storage or memory 824, which can be embedded and/or may be removable. For example, the non-volatile memory may be ROM, PROM, EPROM, EEPROM, flash memory, MMCs, SD memory cards, Memory Sticks, CBRAM, PRAM, FRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 810. As indicated, this may include a user application that is resident on the entity or accessible through a browser or other user interface for communicating with the management computing entity and/or various other computing entities.

In another embodiment, the user device 810 may include one or more components or functionality that are the same or similar to those of the management computing entity, as described in greater detail above. As will be recognized, these architectures and descriptions are provided for example purposes only and are not limiting to the various embodiments.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Arca Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method for interfacing of devices, at least a portion of the method being performed by one or more processors, the method comprising:

determining one or more functions associated with a first device;
determining one or more function types for the functions;
grouping the functions under a group name based on the one or more function types;
providing the group name to a second device for use in connection with an application; and
communicating, using the functions, with the first device via the group name and via the application.

2. The method of claim 1, further comprising:
determining one or more properties associated with the functions; and
determining corresponding second function types based on the properties, wherein the one or more properties include a power usage or a computational load associated with at least one function of the functions.

3. The method of claim 2, further comprising grouping the functions based on the second function types.

4. The method of claim 1, wherein the providing the group name to the second device comprises communicating the group name to a host device.

5. The method of claim 1 further comprising:
associating a first function of the one or more functions to a first processor; and
associating a second function of the one or more functions to a second processor, the one or more processors including at least one of the first processor or the second processor.

6. The method of claim 5, wherein:
the first device comprises a memory device, and
the memory device comprises a memory transfer protocol that enables the memory device to interface the one or more processors or a network fabric.

7. The method of claim 1, wherein the determining the one or more functions associated with the first device comprises transmitting information via an interface between the first device and the second device, and wherein the interface comprises an application programming interface (API).

8. The method of claim 1, further comprising making a connection between the first device and the second device, the making of the connection further including a discovery process.

9. The method of claim 1, wherein the determining the one or more functions associated with a first device and determining the one or more function types is based on information provided by the second device regarding the grouping of the functions.

10. A system for interfacing of devices, comprising:
a host device comprising a first memory and an application;
a memory device comprising a second memory and a processing element;
wherein the system stores computer-executable instructions which, when executed by one or more processors, cause the one or more processors to perform operations comprising:
determining one or more functions associated with the memory device; and
determining one or more function types for the functions;
grouping the functions under a group name based on the one or more function types;
providing the group name to the host device for use in connection with an application; and
communicating, using the functions, with the memory device via the group name and via the application.

11. The system of claim 10, wherein the operations further comprise:

determining one or more properties associated with the functions; and determining corresponding second function types based on the properties, wherein the one or more properties include a power usage or a computational load associated with at least one function of the functions.

12. The system of claim 11, wherein the operations further comprise grouping the functions based on the second function types.

13. The system of claim 10, wherein the providing the group name to the host device comprises communicating the group name to the host device.

14. The system of claim 10, wherein the determining one or more functions associated with the memory device comprises transmitting information via an interface between the memory device and the host device, and wherein the interface comprises an application programming interface (API).

15. The system of claim 10, wherein the operations further comprise:

associating a first function of the one or more functions to a first processor; and associating a second function of the one or more functions to a second processor, the one or more processors including at least one of the first processor or the second processor.

16. The system of claim 10, wherein the determining the one or more functions associated with the memory device and determining the one or more function types is based on a information provided by the host device regarding the grouping of the functions.

17. A non-transitory computer-readable medium storing instructions that, when executed by a processor, cause the processor to:

determine one or more functions associated with a first device;

determine one or more function types for the one or more functions;

group the one or more functions under a group name based on the one or more function types;

provide the group name to a second device for use in connection with an application; and communicate, using the one or more functions, with the first device via the group name and via the application.

18. The non-transitory computer-readable medium of claim 17, storing further instructions that, when executed by the processor, cause the processor to:

determine one or more properties associated with the one or more functions; and determine corresponding second function types based on the properties, wherein the one or more properties include a power usage or a computational load associated with at least one function of the one or more functions.

19. The non-transitory computer-readable medium of claim 18, storing further instructions that, when executed by the processor, cause the processor to group the one or more functions based on the second function types, wherein the providing the group name to the second device comprises communicating the group name to a host device.

20. The non-transitory computer-readable medium of claim 17, wherein the determining the one or more functions associated with a first device and determining the one or more function types are based on a information provided by a host device regarding the grouping of the functions.

* * * * *